US007002455B2

(12) United States Patent
Buck et al.

(10) Patent No.: US 7,002,455 B2
(45) Date of Patent: Feb. 21, 2006

(54) METHOD AND APPARATUS FOR MONITORING TIRE PRESSURE

(75) Inventors: M. Scott Buck, Commerce Township, MI (US); Thomas H Tu, Troy, MI (US); Ryan M. Frakes, Grand Blanc, MI (US); David A. Osinski, Sterling Heights, MI (US)

(73) Assignee: General Motors Corporation, Detroit, MI (US)

( * ) Notice: Subject to any disclaimer, the term of this patent is extended or adjusted under 35 U.S.C. 154(b) by 105 days.

(21) Appl. No.: 10/691,104

(22) Filed: Oct. 22, 2003

(65) Prior Publication Data

US 2005/0088293 A1    Apr. 28, 2005

(51) Int. Cl.
*B60C 23/02*    (2006.01)
(52) U.S. Cl. ...................... 340/442; 340/447; 73/146.3
(58) Field of Classification Search ................. 340/442, 340/447; 73/146.2, 146.3
See application file for complete search history.

(56) References Cited

U.S. PATENT DOCUMENTS

| 6,414,592 B1 * | 7/2002 | Dixit et al. ................. 340/447 |
| 6,710,708 B1 * | 3/2004 | McClelland et al. ........ 340/442 |
| 6,745,624 B1 * | 6/2004 | Porter et al. ............... 73/146.2 |
| 6,750,761 B1 * | 6/2004 | Newman ..................... 340/442 |
| 2003/0001734 A1 * | 1/2003 | Schofield et al. ........... 340/442 |
| 2003/0128108 A1 * | 7/2003 | Knapp ........................ 340/442 |

* cited by examiner

*Primary Examiner*—Jeffery Hofsass
*Assistant Examiner*—Jennifer Stone
(74) *Attorney, Agent, or Firm*—Christopher DeVries

(57) ABSTRACT

Methods and apparatus are provided for relearning associations between tire pressure detectors and tire locations on an automobile. An apparatus comprises tire pressure detectors installed on each wheel having a tire, each configured to transmit a unique identification code in response to a tire pressure change greater than a predetermined magnitude in a predetermined time. The apparatus also includes a monitor having a receiver for receiving and a memory for storing the transmitted identification codes and a processor for associating the identification codes with predetermined locations. A method comprises exciting the tire pressure detectors in a predetermined sequence while monitoring transmitted identification codes. The method may further include storing the received unique identification codes in a predetermined order corresponding to the predetermined sequence.

14 Claims, 3 Drawing Sheets

METHOD AND APPARATUS FOR MONITORING TIRE PRESSURE

TECHNICAL FIELD

The present invention generally relates to monitoring tire pressure in a vehicle such as an automobile. The present invention more particularly relates to re-learning associations between tires and tire locations in response to a change, such as rotating the tires on a vehicle.

BACKGROUND

To improve safety, reduce tire wear, and increase fuel economy, certain classes of motor vehicles are required or soon will be required by statute to have tire pressure monitoring systems. Each tire at each location on the motor vehicle has a pressure which is communicated as pressure data to the driver. A pressure sensor and other associated circuitry may be specific to each wheel and the tire mounted thereon. It is generally necessary to be able to identify which sensor reading is coming from which location on the motor vehicle. The problem of associating tires and tire pressure sensors with tire locations is complicated by the fact that tires may be moved from one location to another, such as in tire rotation, and the original associations made meaningless. Most conventional methods of relearning associations between tires and tire locations require special tools or addition of interrogation devices at each tire location, thereby increasing the cost of the tire monitor.

Accordingly, it is desirable to provide a tire pressure monitoring system adapted to relearn associations between tire pressure sensors and tire locations. In addition, it is desirable to reduce the amount of hardware that is added to the motor vehicle to achieve relearning and to eliminate the need for specialized tools in the relearning process. Furthermore, other desirable features and characteristics of the present invention will become apparent from the subsequent detailed description and the appended claims, taken in conjunction with the accompanying drawings and the foregoing technical field and background.

BRIEF SUMMARY

According to various exemplary embodiments, a tire pressure monitor (TPM) receiver is provided. The electronic automotive tire pressure monitor receiver is configurable for relearning associations between tire pressure transmitter identification codes and locations for vehicle tires, where the relearning is based at least partially upon user-supplied tire pressure changes to each tire in a predetermined order.

According to further embodiments, a method is provided for relearning associations between a plurality of tire pressure transmitters and a plurality of locations for tires, the method comprising the step of sequentially interrogating by an operator, in a predetermined order, tire pressure detectors at each location of the plurality of locations for tires to induce transmission of tire-specific identification codes to a monitor configured to store the identification codes in association with the locations for tires.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any expressed or implied theory presented in the preceding technical field, background, brief summary or the following detailed description.

Figure 1:
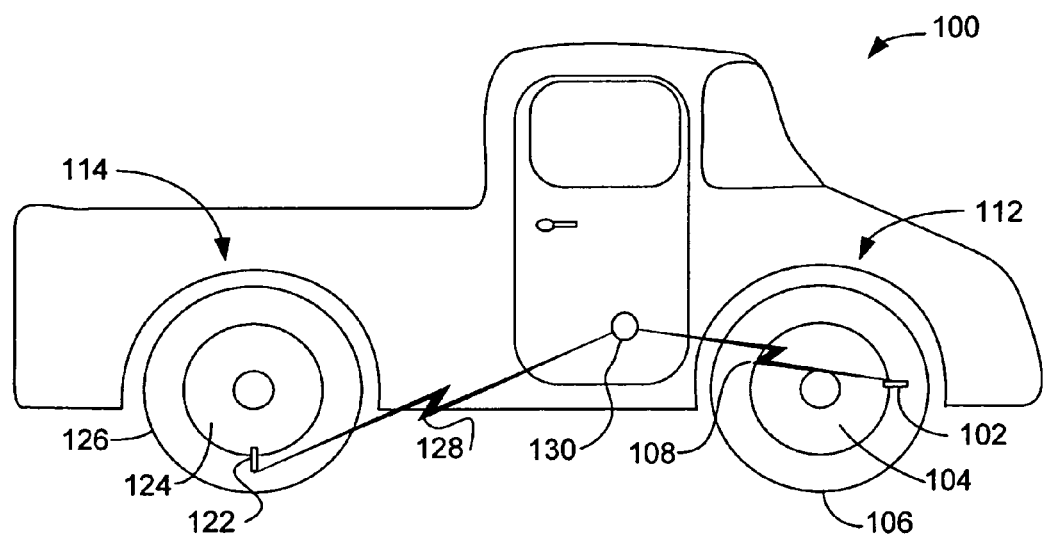
FIG. 1 is a diagram of an exemplary embodiment of a tire pressure monitoring system.

FIG. 1 shows a side elevation of exemplary motor vehicle 100 having wheel 104 with tire 106 mounted in the right front location 112 and wheel 124 with tire 126 mounted in the right rear location 114. Each wheel 104, 124 has a tire pressure detector 102 and 122, respectively, communicating with a tire pressure monitor receiver 130. Tire pressure detectors 102 and 122 may be electronic, electromechanical, or other devices coupled to a valve stem or which may replace a valve stem of wheels 104, 124. Tire pressure detectors 102, 122 suitably include one or more pressure sensors, which are any devices capable of sensing pressure in tires 106, 126 in conjunction with a transmitter, such as an RF transmitter. In embodiments adaptable to legacy tire designs, the tire pressure detectors 102 and 122 in the wheels 104 and 124 may be coupled to a tire valve stem in the conventional way. Alternatively, other configurations for tire pressure detectors 102 and 122 are also contemplated within the present invention. For example, in particular embodiments, a tire pressure detector 102 may be installed through the tire wall or bead or may be manufactured into the tire wall or bead of tire 106. Tire 126 similarly has tire pressure detector 122 which may also be mounted in the same manner as tire pressure detector 102. Tires on the opposite side of the motor vehicle, not shown, are similarly configured. It will be appreciated that tires are normally filled with air, but that other gases or fluids, such as dry nitrogen or water, may be used. The type of gas or gases used to pressurize the tire is not a limitation of the present invention.

Figure 2:
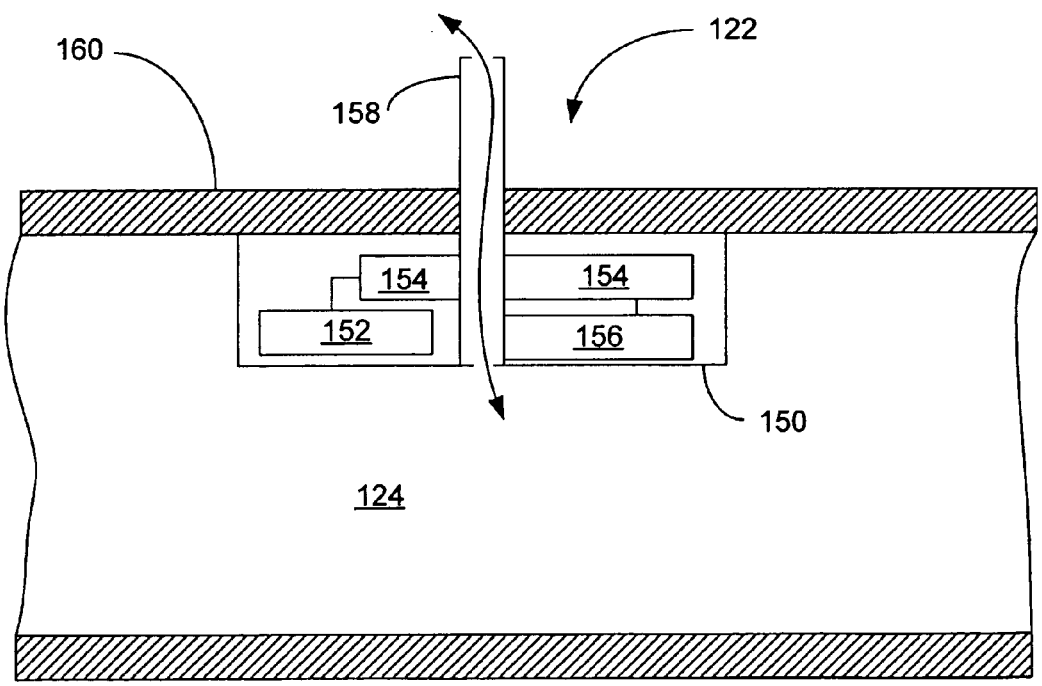
FIG. 2 is a diagram of an exemplary embodiment of a tire pressure detector.

FIG. 2 shows tire pressure detector 122 in more detail. Tire pressure detector 122 suitably includes a valve stem 158 and a housing 150 coupled to the valve stem. The valve stem 158 transfers air into and out of the tire in any conventional manner as shown by the double arrow in FIG. 2, and also may serve as an antenna. Valve stems 158 which serve as antennas are typically made of metal. In an alternate embodiment, the valve stem may be an antenna support for a discrete antenna. The housing 150 contains, at least in part, the pressure sensor 152 coupled to a processor 154 coupled to a transmitter 156 coupled to the antenna/valve stem 158.

Pressure sensor 152 senses the pressure in the tire and makes pressure measurement data available to processor 154. The pressure sensor 152 may be of any conventional type appropriate for the pressure range of the tire. The tire pressure detector 122 also includes a processor 154 which controls the transmitter 156. The processor 154 normally controls the transmitter 156, as appropriate, to transmit the sensed tire pressure periodically. For example, the processor 154 may control the transmitter 156 to transmit tire pressure data once every minute. The processor 154 also determines if a rapid change in tire pressure has occurred and controls the transmitter 156 to responsively transmit the unique ID number, pressure change identifier and, optionally, the tire pressure data to the monitor receiver 130. A rapid change in tire pressure could occur as a result of pumping air into the tire 106, 126 from an air hose at a filling station, releasing air from the tire 106, 126 by depressing the valve pintle in the conventional manner, or from a leak or a sudden temperature change. For example, a tire pressure change of 1.6 psi or so over a period of twenty seconds may initiate a responsive data transmission. Tire pressure change magnitudes over periods of time may be adapted for particular sizes and types of tires and tire pressures.

Transmitter 156 transmits tire pressure data and unique tire pressure detector identification codes to the tire pressure monitor receiver 130 over links 108 and 128, respectively. Each tire pressure detector, including detectors 102 and 122, has a unique tire pressure detector identification code, or ID number. The code may be stored in transmitter 156, processor 154, or a memory (not shown) associated with the processor 154. Association of the ID number with a particular tire location 112, 114 enables the monitor receiver 130 to know from which tire location 112, 114 the data is being received.

Figure 3:
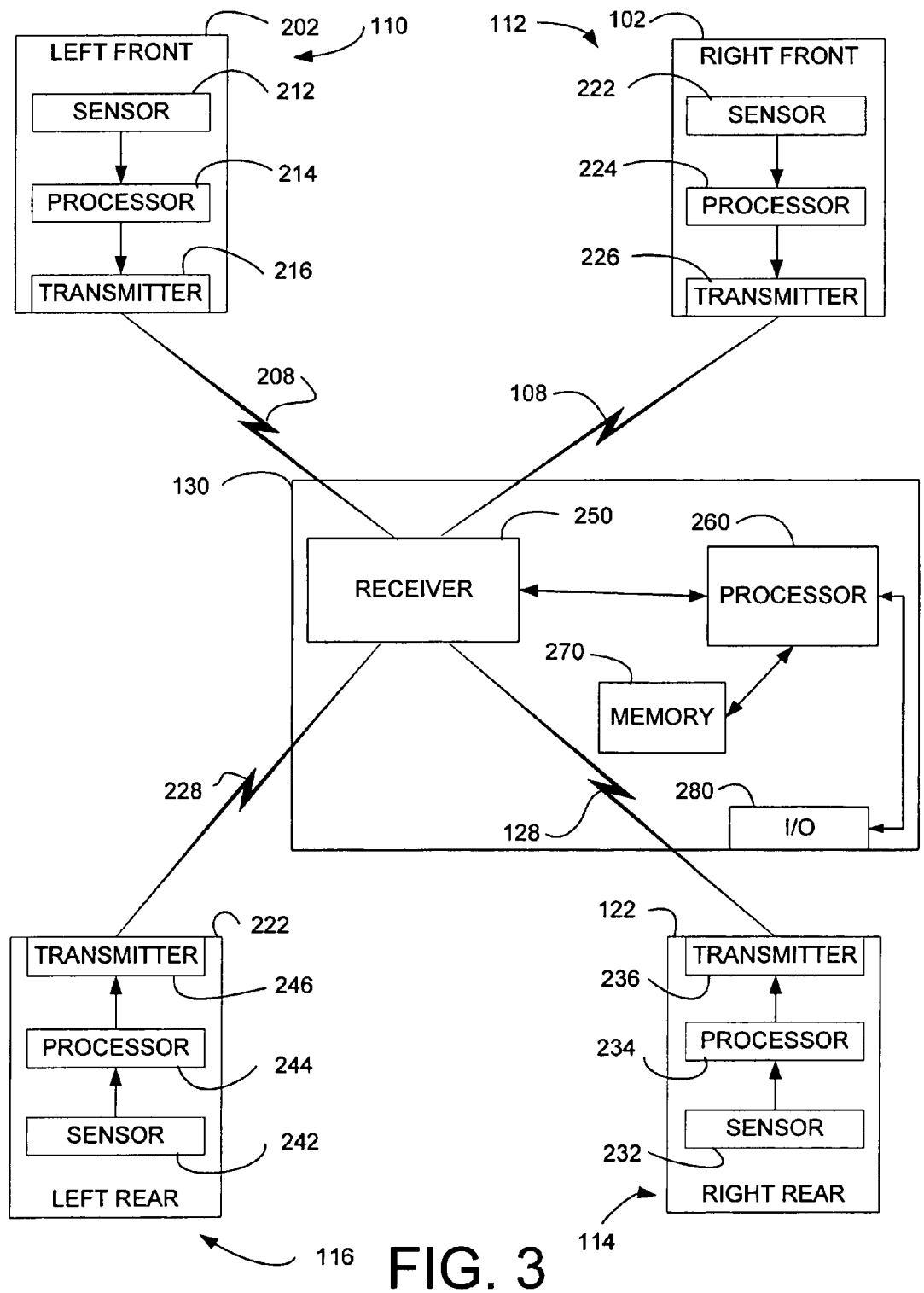
FIG. 3 is a block diagram of an exemplary embodiment of a tire pressure monitoring system.

FIG. 3 shows a block diagram of an exemplary embodiment of a tire pressure monitoring system. Tire pressure detectors 202, 102, 122, and 222 correspond to the left-front tire location 110, the right-front tire location 112, the right-rear tire location 114, and the left-rear tire location 116, respectively. Other configurations are possible for vehicles having different numbers of tires. For example, a spare tire for vehicle 100 may also have a tire pressure detector, or a tire pressure detector could be installed in each tire of a two-wheeled or 18-wheeled vehicle. Each tire pressure detector 202, 102, 122, and 222 includes a tire pressure sensor 212, 222, 232, and 242, respectively; a processor 214, 224, 234, and 244, respectively; and a transmitter 216, 226, 236, and 246, respectively. Each tire pressure sensor 212, 222, 232, and 242 senses the air pressure in its respective tire and provides data relating to the tire pressure to the respective processor 214, 224, 234, and 244. Each processor 214, 224, 234, and 244 is configured to detect rapid changes in tire pressure and to control the respective transmitter 216, 226, 236, and 246 to responsively transmit data and the unique identification code to receiver 250 in monitor receiver 130. The data and the unique identification code are contents of a pressure change message transmitted to the monitor receiver 130. In an alternate embodiment, the transmitter may transmit only the unique identification code as a pressure change message in response to a rapid change in tire pressure. Absent a rapid change in tire pressure, processors 214, 224, 234, and 244 control respective transmitters 216, 226, 236, and 246 to periodically transmit the unique identification code to receiver 250 in monitor receiver 130. In a particular embodiment, each tire pressure detector 202, 102, 122, and 222 also transmits a function code that differentiates between normal periodic transmissions and transmissions caused by tire pressure changes. The rate of pressure change created by releasing air from or pumping air into the tire 126 through the valve stem 158 is sufficiently rapid to initiate transmission of a pressure change message.

Monitor receiver 130 includes receiver 250, processor 260, and memory 270. The receiver 250 receives data from each tire pressure transmitter 216, 226, 236, and 246 over wireless links 208, 108, 128 and 228, respectively. The processor 260 associates the unique identification codes of the tire pressure detectors 202, 102, 122, and 222 with their respective tire locations, as will be discussed more fully below. Memory 270 stores the associations between the unique identification codes and the tire locations, enabling the processor 260 to immediately associate pressure data received from a particular transmitter 216, 226, 236, or 246 with a tire location 110, 112, 114, or 116, respectively. The unique identification codes may be numbers or bit patterns or any other identifiers. For example, a unique pulse repetition frequency, a transmission frequency, or a unique modulation scheme may be used as a unique identification code. Monitor 130 further includes one or more I/O devices 280 coupled to said processor 260 for interaction with a user or other automotive subsystems.

Figure 4:
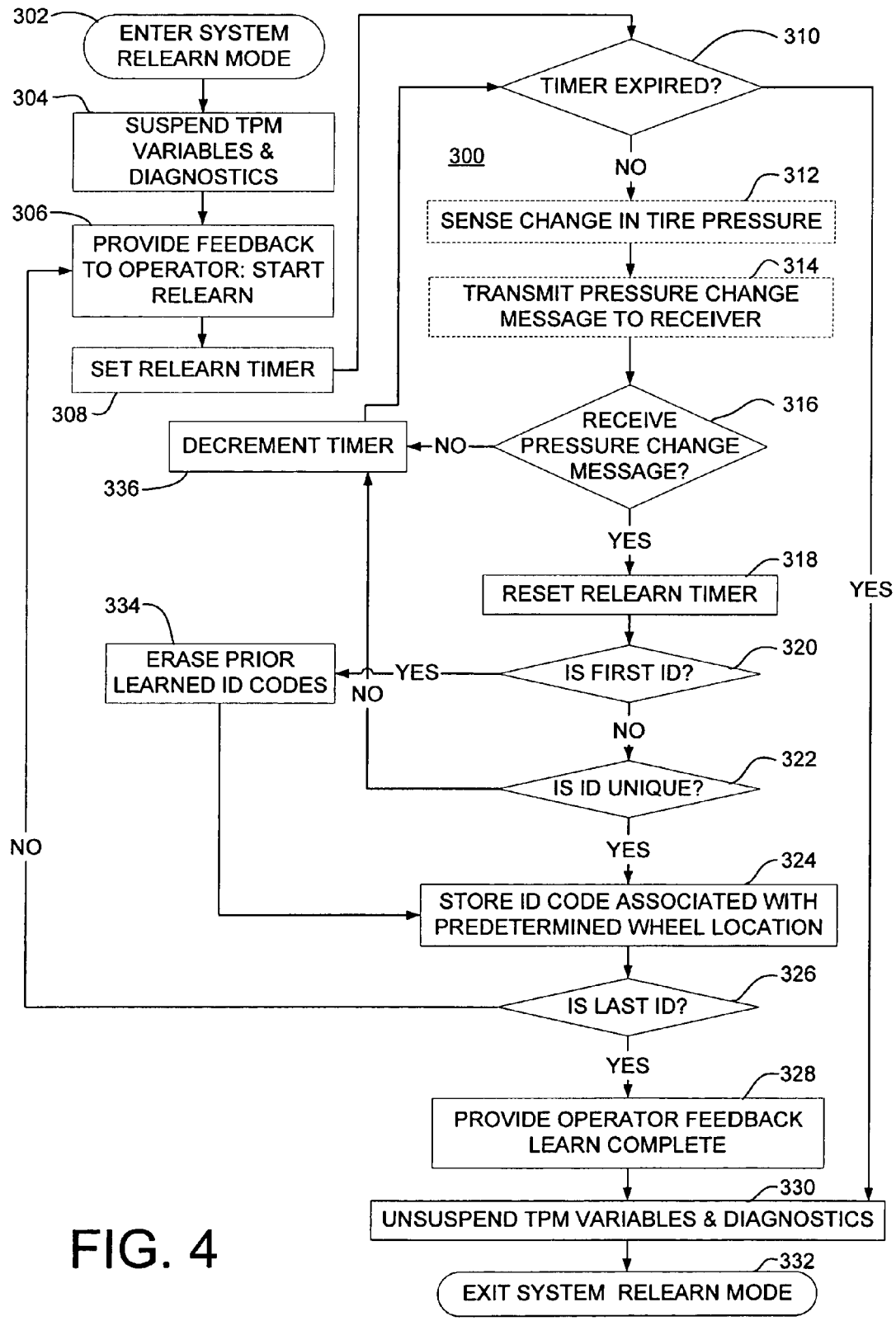
FIG. 4 is a flowchart of an exemplary embodiment of a method of relearning associations between tire pressure sensors and tire locations on a vehicle.

FIG. 4 shows a flowchart of an exemplary method 300 of relearning associations between tires and tire locations which may be implemented in software in processor 260 as shown in FIG. 2. In some alternate embodiments, types of logic other than software, such as firmware or hardware, may be used. The process 300 begins in step 302 when the processor is commanded by a user through an input device 280 to enter a relearn mode. Any type of input device may be used, including existing input devices presently found in vehicle 100 (FIG. 2). For example, turning the headlights or other accessories on and off several times in sequence may initiate relearning mode.

Once relearn mode has been entered at step 302, processor 260 suspends tire pressure monitor (TPM) variables and diagnostics in step 304 to prevent normal operation of the monitor receiver 130 during relearn mode. Suspending the TPM variables and diagnostics prevents the inputs received during the relearn process from being interpreted as operational tire pressure information. The suspended variables and diagnostics are saved for reactivation in step 330 after relearn mode is complete. Optional step 306 provides feedback to the operator to the effect that relearn mode has been entered. For example, the processor 260 may control a horn of the automobile through an output device 280 to cause one or more horn chirps to signal the operator in step 306 that relearning mode has been entered. For a further example, the processor 260 may control a light, or telltale, on the instrument panel cluster or elsewhere of an automobile to begin flashing after relearning mode has been entered, and to remain flashing until relearning mode is complete. Step 308 sets a relearn timer so that the process 300 may later time out in case no inputs, as discussed below, are received. In step 310, processor 260 determines if the relearn timer has expired. If the processor 260 determines that the relearn timer has expired, process 300 continues at step 330, where the TPM variables and diagnostics are reactivated from suspension and step 332 exits from relearn mode and terminates the relearn process.

If processor 260 determines in step 310 that the relearn timer has not expired, step 316 determines if a pressure change message has been received. Step 316 will determine that a pressure change message has been received if steps 312 and 314, which take place in a tire pressure detector 102, 122, 202, or 222, have been completed. Note that steps which take place in processor 260 are shown in the flowchart of FIG. 4 as polygons made of solid lines, and steps to be taken in the tire pressure detector are shown as polygons made of broken lines. In step 312, sensor 212, 222, 232, or 242 senses a change in tire pressure induced by the operator. In one embodiment, the operator will sequentially cause a tire pressure change in each tire in a predetermined order. For example, the operator may cause tire pressure changes in the left front, right front, right rear, and left rear tire in that order by releasing air pressure through the valve. Other sequences may be alternatively be used. When a user-supplied increase or decrease in pressure is sensed in step 312, the tire pressure transmitter 216, 226, 236, or 246 transmits, in step 314, a pressure change message to the receiver 250 in monitor 130.

Step 312 occurs as a result of sequential interrogation of the tire pressure detectors 202, 102, 122, and 222 by an operator increasing or reducing the tire pressure in each tire in a predetermined order. Changing the tire pressure excites the tire pressure detector to transmit at least the unique identification code and pressure change identifier. In a particular embodiment of the method, step 312 occurs once for each tire. If step 316 determines that no pressure change message has been received, step 336 decrements the relearn timer and loops back to step 310. The loop 310–316–336–310 waits for steps 312 and 314 to take place. If the relearn timer expires while waiting for steps 312 and 314 to take place, steps 330 and 332 terminate relearn mode as previously described.

If the processor 260 determines in step 316 that a tire pressure change message has been received, process 300 resets the relearn timer in step 318. If step 320 then determines that the tire pressure change message contains the first unique identification code received during the current relearn mode, step 334 erases from memory 270 the unique identification codes previously learned. In an exemplary embodiment, memory 270 has a register, or slot, in memory for each unique identification code, wherein each memory slot has a one-to-one correspondence with a tire location 110, 112, 114, and 116. The presence of a unique identification code in a particular memory slot creates the association between the unique identification code and the tire location 110, 112, 114, or 116. By erasing the unique identification codes from these memory slots in step 334, the previous associations between unique identification codes and tire locations 110, 112, 114, and 116 are also erased. After the previous unique identification codes are erased in step 334, the first unique identification code is stored in a memory slot for the first predetermined tire location in step 324.

If processor 260 determines in step 320 that the unique identification code received is not the first unique identification code received, the processor 260 determines in step 322 if the received unique identification code is unique compared to those already stored. For example, if an operator incorrectly changes the tire pressure in a particular tire twice, the second transmission of the unique identification code in the tire pressure change message will cause step 322 to determine that the received unique identification code is not unique as compared to those already stored. If the received unique identification code is not unique compared to those already stored, the relearn timer is decremented in step 336 and the loop 310–316–336–310 is reentered to wait for steps 312 and 314 to complete in the tire pressure detector 202, 102, 122, or 222.

If processor 260 determines in step 322 that the received unique identification code is unique compared to those already stored, the received unique identification code is stored in the next open memory slot in memory 270. Step 326 then determines if the unique identification code just stored in step 324 was the last unique identification code expected. For example, step 326 may check to see if the last memory register has a unique identification code stored in it. If the last unique identification code has been stored, then step 328 provides feedback to the operator that the relearn mode is ending. For example, the processor 260 may control the horn to emit a double chirp and may turn off the flashing telltale on the instrument panel cluster or otherwise provide appropriate feedback to the user. Step 330 reactivates the TPM variables and diagnostics to put the TPM into normal operating mode and step 332 exits the relearn mode. For example, step 332 may deconstruct any software objects unique to relearn mode.

If processor 260 determines in step 326 that the last unique identification code has not been received, operator feedback is provided in step 306. For example, a single horn chirp may be produced as previously described to indicate to the operator that another unique identification code is expected. The relearn timer is reset for the next unique identification code in step 308 and the wait loop 310–316–336 is reentered to wait for the next user-supplied pressure change in steps 312 and 314.

The described exemplary embodiment of a tire pressure monitoring system reduces the amount of hardware and software needed compared to systems with hardware in each wheel well to communicate with the tire in that wheel well. Further, a monitor receiver 130 may be used with the tire pressure transmitters 102, 122 of various manufacturers. Some existing monitor receivers used with other systems may be reprogrammed to become monitor receivers 130.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A method of learning associations between a plurality of tires each having a unique identification code and a plurality of locations for tires, comprising:
   initiating a timer before receiving a first identification code;
   receiving the unique identification codes from each tire of the plurality of tires in response to a change in tire pressure in said each tire in a predetermined order of the plurality of locations for tires;
   resetting said timer after receiving each identification code;
   correlating the receipt of the unique identification codes to the predetermined order of the plurality of locations for tires to thereby associate each tire of the plurality of tires to one location of the plurality of locations for tires; and
   terminating said method if said timer indicates that a predetermined threshold of time has expired before an identification code is received.

2. The method of claim 1, wherein the change in tire pressure is an operator-supplied change in tire pressure.

3. The method of claim 1, the method further comprising the steps of:
   determining if a particular received unique identification code is a first unique identification code received; and
   if so, erasing existing correlated unique identification codes.

4. A method of learning associations between a plurality of tires each having a unique identification code and a plurality of locations for tires, the method comprising:

receiving the unique identification codes from each tire of the plurality of tires in response to a change in tire pressure in said each tire in a predetermined order of the plurality of locations for tires;

correlating the receipt of the unique identification codes to the predetermined order of the plurality of locations for tires to thereby associate each tire of the plurality of tires to one location of the plurality of locations for tires;

testing each second and subsequently received identification code to determine if said identification code is unique compared to said identification codes already stored; and storing only identification codes that are determined to be unique compared to said identification codes already stored.

5. The method of claim 1, wherein said receiving step further comprises the step of communicating receipt of said unique identification code to a user.

6. A tire pressure monitor system for a vehicle having a plurality of tires each mounted on a wheel at one of a plurality of locations relating to said vehicle, the tire pressure monitor system comprising:

a plurality of tire pressure detectors each coupled to one of the plurality of wheels, each tire pressure detector further comprising:

a transmitter having a unique identification code; and a pressure sensor configured to detect changes in the pressure in said one tire mounted on said wheel;

a receiver configured to receive said transmitted unique identification codes;

a first processor coupled to said receiver, wherein said processor is configured to respond to a user-supplied command to relearn associations between said identification codes and said locations by accepting said received identification codes in a predetermined order related to said locations; and a memory coupled to said first processor, wherein said memory is configured to store each said identification code in association with each said respective location, wherein each said detector processor is configured to:

determine a magnitude of the pressure change within a predetermined time period;

compare the pressure change magnitude within the predetermined time period to a predetermined threshold;

control the transmitter to transmit pressure data and the identification code periodically if the determined magnitude is less than the predetermined threshold; and control the transmitter to transmit at least the identification code immediately if the determined magnitude is greater than the predetermined threshold.

7. The tire pressure monitor system of claim 6, wherein each tire pressure detector further comprises a detector processor coupled to said transmitter and to said pressure sensor and configured to control said transmitter to transmit said unique identification code in response to a user-supplied signal.

8. The tire pressure monitor system of claim 7, wherein said user-supplied signal comprises a pressure change in said each tire, and wherein said pressure sensor is configured to provide an indication of the pressure change to said detector processor.

9. The tire pressure monitor system of claim 6, further comprising:

at least one device for communicating with a human user, said at least one device coupled to and controlled by said first processor.

10. The tire pressure monitor system of claim 9, wherein said at least one device for communicating generates an indication that said unique identification code has been stored.

11. The tire pressure monitor system of claim 9, wherein said at least one device generates an indication that said first processor has been commanded to relearn said associations.

12. The tire pressure monitor system of claim 6, wherein said transmitter comprises a plurality of transmitters each being coupled to a valve stem of one of said tires.

13. The tire pressure monitor system of claim 12, wherein said plurality of transmitters is equal to said plurality of tires.

14. The tire pressure monitor system of claim 6, wherein said vehicle has four wheels and said predetermined order consists of the sequence: left front, right front, right rear, left rear.

* * * * *